United States Patent [19]
Berman

[11] 3,891,179
[45] June 24, 1975

[54] HOBBY CASTING MOLD

[75] Inventor: Morton Berman, Brooklyn, N.Y.

[73] Assignee: Avalon Industries, Inc., Brooklyn, N.Y.

[22] Filed: Apr. 22, 1974

[21] Appl. No.: 462,731

[52] U.S. Cl. ............... 249/134; 249/160; 249/167; 249/169; 249/219 R; 425/DIG. 57
[51] Int. Cl. ........ B28b 7/34; B29c 1/00; B29c 5/00
[58] Field of Search .......... 249/134, 160, 154, 163, 249/167, 168, 169, 219 R; 425/DIG. 57; 264/342

[56] References Cited
UNITED STATES PATENTS

| | | | |
|---|---|---|---|
| 2,687,157 | 8/1954 | Cowan | 264/342 X |
| 2,871,619 | 2/1959 | Walters | 249/134 X |
| 3,177,528 | 4/1965 | Flower et al. | 249/134 X |
| 3,309,738 | 3/1967 | Friedman | 425/57 X |
| 3,332,658 | 7/1967 | Lemelson | 249/160 X |
| 3,357,438 | 12/1967 | Castagna | 249/219 RX |
| 3,527,439 | 9/1970 | Lawmaster | 249/134 X |

Primary Examiner—J. Howard Flint, Jr.
Attorney, Agent, or Firm—Kirschstein, Kirschstein, Ottinger & Frank

[57] ABSTRACT

A durable strong two-piece hobby casting mold with a unitary leak-proof substantially continuous labyrinth clamp seal on three sides of the mold and a wide open top through which castable material can be introduced when the two halves of the mold are assembled and interlocked. The mold is formed by injection molding from a translucent synthetic plastic such as polypropylene which is pliable in thin sections so that the movable portions of the clamp seal can be unitarily connected by living hinges to one of the halves of the mold. The translucency of the mold enables a user readily to observe, from inspection of the outer surfaces of the mold, the height of the castable material being introduced. Polypropylene has a slick surface which enables it to be parted from the set cast material without the necessity of applying a parting coating to the inner surface of the mold. The mold can be used to cast any suitable material. Usually the material is liquid at a mild elevated temperature below the softening temperature for polypropylene, and will harden when cooled to room temperature, typical such materials being wax and soap. However, the mold can be used with materials which are liquid at room temperature and are internally curable so as to harden upon standing, such for example as epoxies and RTV elastomers. Also the mold can be used to cast pliable materials such as clay that can be packed into the mold. The mold includes a base that is made in one-piece with one or both halves of the mold. It can be reused as frequently as is desired. The mold can be assembled easily and quickly. It is provided with means to enable a wick to be positioned readily. Desirably the interior surfaces of the mold are sculptured in full relief so as to create an aesthetic, richly ornamented, decorated cast piece.

20 Claims, 8 Drawing Figures

PATENTED JUN 24 1975 3,891,179
SHEET 1
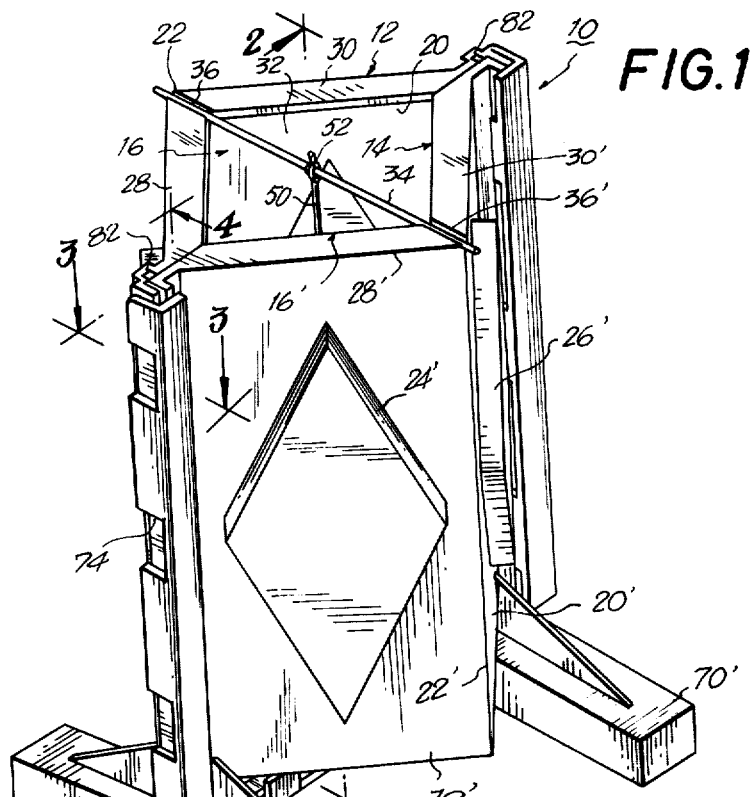
FIG.1
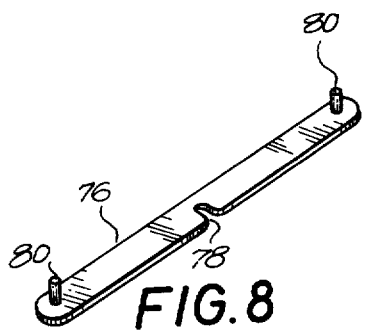
FIG.8
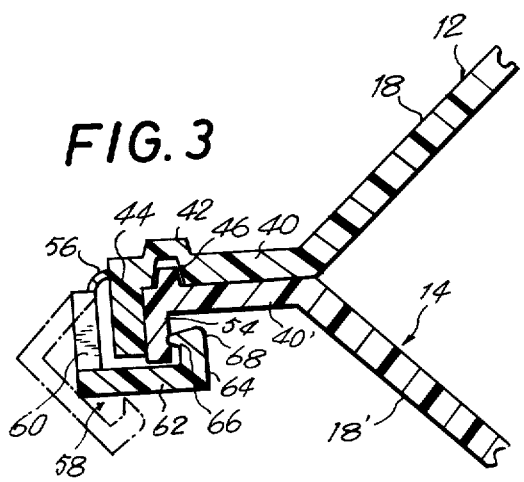
FIG.2
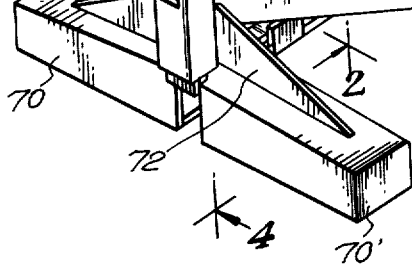
FIG.3
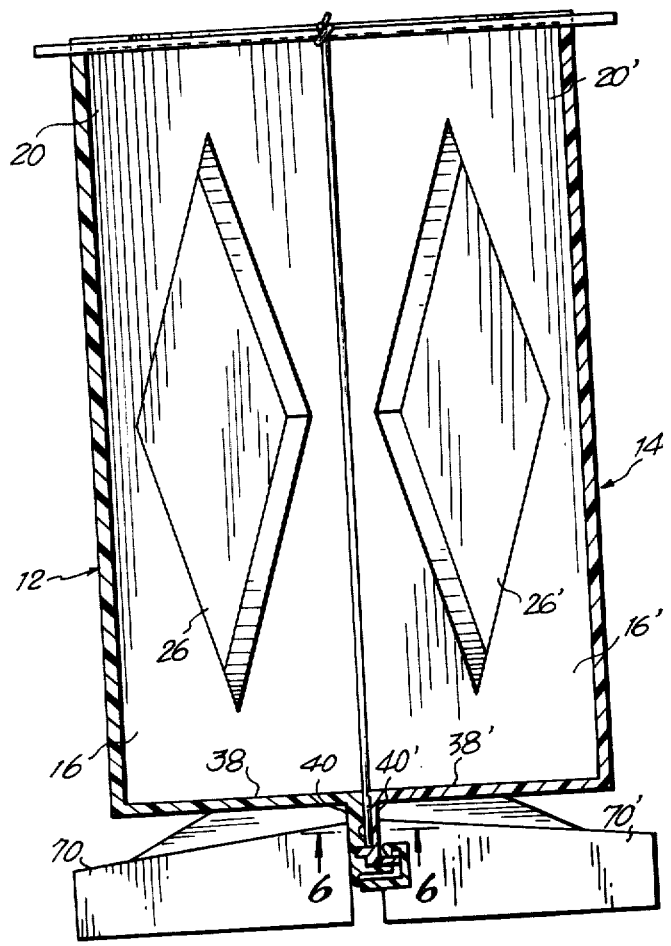

HOBBY CASTING MOLD

BACKGROUND OF THE INVENTION

1. Field of the Invention

Two-piece hobby casting mold

2. Prior Art

Split hobby molds constituting two halves that when assembled define a sculptured interior space into which a castable material can be introduced are a comparatively recent innovation in the pastime field, although two-piece molds have been used for centuries for casting utilitarian objects of simple shapes. The older molds, being designed, as they were, for factory production of large number of pieces, customarily were thick and heavy, usually being made of metal for long time durability. Hobby molds on the other hand, are not designed for extensive use and, therefore, can be thin-walled and made of light weight material such as synthetic plastics. But since they were so thin and since they were made of plastic which in thin section is pliable, their meeting faces where the mold halves abutted did not form a good seal; hence the castable material frequently entered the joint between the halves where it hardened to form a flash that detracted from the appearance of the cast piece, requiring trimming before display and tending to discourage repeated use of the mold as well as initiating a train of word-of-mouth disparagement of the mold.

SUMMARY OF THE INVENTION

1. Purpose of the Invention

It is an object of the invention to provide a split hobby casting mold of light, strong durable material which forms an excellent liquid-tight seal between the two halves of the mold.

It is another object of the invention to provide a hobby casting mold of the character described having a wide open top and a substantially continuous labyrinth clamp seal running down the two sides and across the bottoms of the mold halves.

It is another object of the invention to provide a mold of the character described with a unique labyrinth clamp seal that constitutes two halves each formed in one-piece with its respective mold half.

It is another object of the invention to provide a mold of the character described which is so constructed that each half thereof, together with the associated seal half can be made by a high speed inexpensive rapid production process such as injection molding.

It is another object of the invention to provide a mold of the character described in which the seal includes two broad facing planar webs each terminating at a perpendicular squat flange, the webs being mutually nestable and including a rib-and-groove liquid dam.

It is another object of the invention to provide a mold of character described in which the parts of the rib-and-groove-dam are pressed together by a simple but effective clamp that is easily manually engaged and disengaged for assembly and disassembly of the mold halves.

It is another object of the invention to provide a mold of character described having mold halves fabricated of translucent polypropylene so that a user can observe from the outside of the mold the height of liquid castable material being poured into the mold and further so that the mold halves can be separated from the cast objects without applying a parting coating to the inner surface of the mold before casting.

It is another object of the invention to provide a mold of character described that includes a base that is in one-piece with either or both halves of the mold so that the assembled mold is free-standing.

It is another object of the invention to provide a mold of character described that includes structure for anchoring the ends of a wick when the castable material is wax, the lower end of the wick interrupting the seal.

It is another object of the invention to provide a mold of character described that can be fabricated at a low additional cost to include a richly sculptured interior surface thereby to be capable of casting an elaborately ornamented piece.

It is another object of the invention to provide a mold of character described which constitutes few and inexpensive pieces, presents a neat and attractive appearance and can be used safely by young people without extensive instructions.

Other objects of the invention in part will be obvious and in part will be pointed out hereinafter.

2. Brief Description of the Invention

The hobby casting mold of the present invention constitutes two halves which when assembled define a mold cavity. The upper end of the cavity is open for the introduction of material to be molded in the cavity. The bottom of the mold cavity has a passageway of small diameter at the interface between the two halves leading downwardly from the mold cavity for the insertion of the lower end of a wick when the mold is used for its principal purpose which is to form a wax candle. The sides of the two mold halves have plane webs extending away from the mold cavity, the webs of opposed mold halves being in face-to-face contact. The web of one of the mold halves has a continuous groove extending down its sides and across its bottom. The web of the other mold half has an essentially continuous matching rib (tongue) which is receivable in the groove to form a dam when the two mold halves are assembled. The rib is interrupted at the bottom portion of the web associated with that mold half to permit the aforesaid wick-receiving passageway to extend through the interruption and down to the bottom edge of the web.

The webs of both mold halves have, near and outwardly of the rib-and-groove, squat perimetral flanges that are perpendicular to the webs, the flanges of the two halves extending in the same direction and being so mutually disposed that one flange nests within the other when the two halves are assembled into a completed mold.

One of the mold halves, for example, the mold half the web of which has the groove therein is provided with a movable clamp portion that is in three separate movable clamp sections, each outwardly of its affiliated flange. One movable clamp section is at one side of the web, the second movable clamp section is at the opposite side of the web and the third movable clamp section is at the bottom of the web. Each section is connected to the associated mold half at the base of the squat flange by a living hinge. Each movable clamp section constitutes a J-shaped member with the long span at the living hinge. Inwardly projecting ribs are formed at the opposite short span of each section. These ribs are designed to engage the inner surface of the squat flange of the opposite mold half when the halves are assembled and the clamp sections are swung toward said

3 opposite mold half whereby the movable sections form with the flange of the opposite mold half a locking clamp. The clamp is effective to press together the rib and groove aforementioned which jointly constitute with the clamp portion a labyrinth clamp seal. This clamp seal, furthermore, places pressure on the wick, if one is present in the groove that interrupts the rib. Thereby a very simple readily assemblable split hobby mold is provided.

Moreover, one or both of the two halves of the mold are formed with bases so that the finished mold is freestanding.

All of the parts, furthermore, are in one piece with one or the other of the two halves of the mold permitting injection molding of each mold half along with its associated components. Consequently, the manufacture of such a hobby mold is quite inexpensive and lends itself to mass production.

The material of choice for making the mold halves by injection molding is polypropylene since this is preferred for living hinges such as mentioned above. In addition, by using prolypropylene the internal surface of the mold is slick so that no parting coating need be applied such as Teflon or Quilon. Still further, due to use of polypropylene, the mold is translucent whereby when the mold is employed for its principally intended purpose, the casting of candles, the height of the liquid wax in the mold can be readily observed without peering into the mold through the open top.

The invention consists in the features of construction, combinations of elements and arrangements of parts which will be exemplified in the devices hereinafter described and of which the scope of application will be indicated in the appended claim.

BRIEF DESCRIPTION OF THE DRAWINGS

In the accompanying drawings in which are shown various possible embodiments of the invention:

FIG. 1 is a perspective view of an assembled mold embodying the present invention;

FIG. 2 is an enlarged sectional view taken substantially along the line 2—2 of FIG. 1;

FIG. 3 is an enlarged fragmentary sectional view taken substantially along the line 3—3 of FIG. 1 and showing in dot-and-dash lines the hinged clamp portion in its open position;

FIG. 8 is a perspective view of a cross bar which in an alternate embodiment of the invention is used to support the upper end of a wick.

PREFERRED EMBODIMENTS OF THE INVENTION

Figure 4:
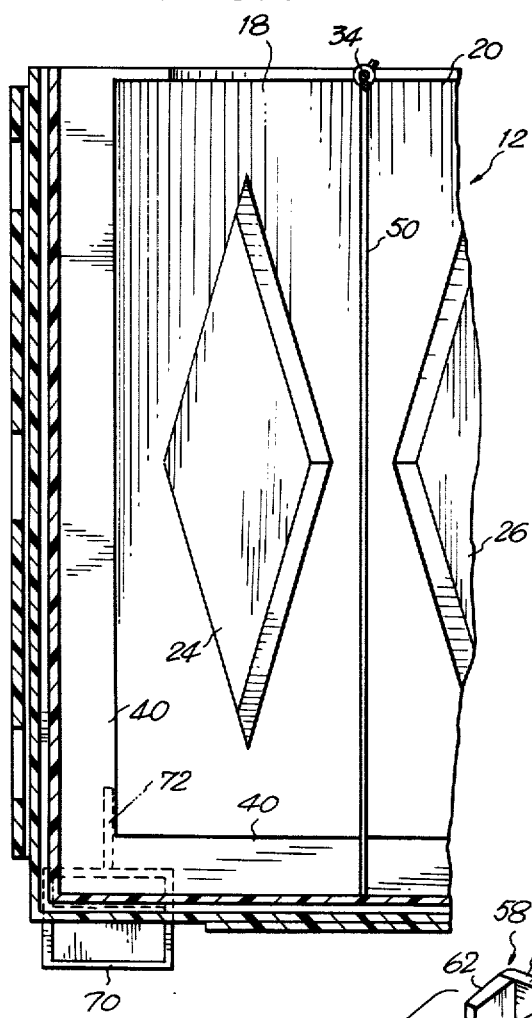
FIG. 4 is a fragmentary sectional view taken substantially along the line 4—4 of FIG. 1.
Figure 7:
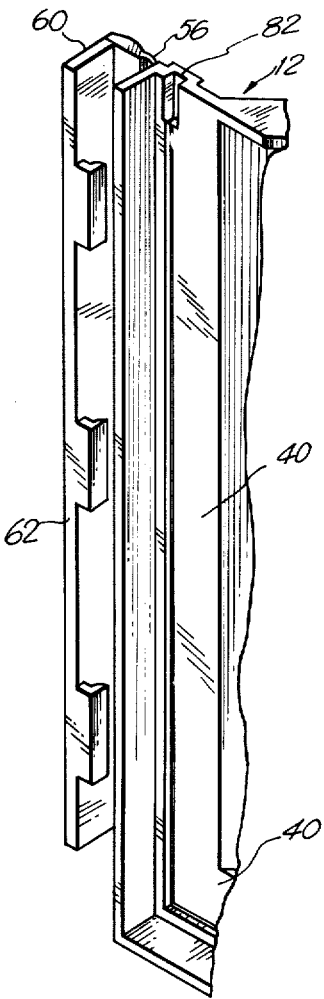
FIG. 7 is a fragmentary perspective view of a side of the mold half that includes a hinged clamp.
Figure 5:
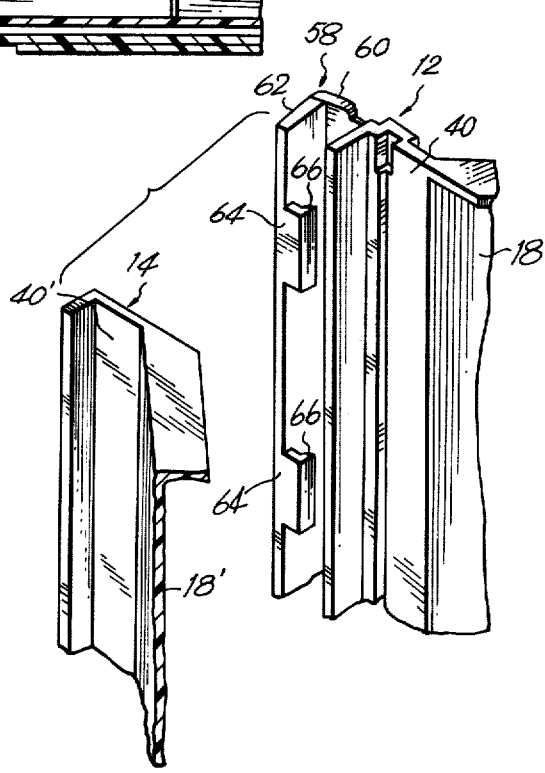
FIG. 5 is a fragmentary exploded perspective view of an upper corner of the mold.
Figure 6:
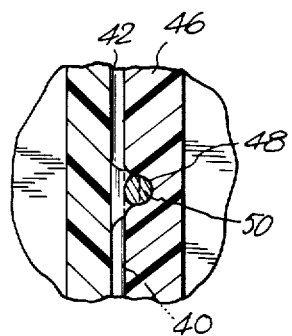
FIG. 6 is an enlarged fragmentary sectional view taken substantially along the line 6—6 of FIG. 2.

Referring now in detail to the drawings, and in particular to FIGS. 1-7, the reference numeral 10 denotes a split hobby casting mold constructed in accordance with the instant invention. As previously indicated, the mold basically constitutes two mold halves which, for convenience, will be denominated by the reference numerals 12 and 14. The mold half 12 is the one which

4 includes the hinged clamp portion. The mold half 14 is the one with which the hinged clamp portion cooperates. Except for the hinged clamp portion and minor other variants which will be mentioned hereinafter, the two sections are mirror images of each other. Therefore, for convenience, only one mold half 12 will be described in detail as to common features of construction. The corresponding parts of the other mold half 14 are denoted in the drawings, where shown, by the same reference numerals, primed to distinguish from the parts of the mold half 12. The primed parts of the mold half 14 will not be mentioned in the specification except where they assist in the description.

Referring to the mold half 12, it constitutes a cavity defining portion 16. The specific configuration of the mold cavity is, it will be understood, not the subject of the present invention. The mold cavity constitutes the joint configuration defined by the combined cavity defining portions 16 and 16'. Said cavity can be selected from an innumerable number of shapes. A typical shape is that shown in the drawings, which is a square prism. Other typical shapes are figurines, e.g., Santa Clauses, Indians and soldiers; animals, e.g., owls, bears and lions, and inanimate objectes, e.g., houses, books, cylinders and automobiles. All of these shapes lend themselves well to the molding of wax candles inasmuch as they are, generally speaking, bulky, three dimensional objects. Desirably, the figure selected is one which is characterized by an embossed surface, preferably a heavily embossed surface. For example, the surface may be richly and deeply ornamented in substantial relief. The particular object to be molded with the mold shown is, as mentioned above, a square candle provided with deep surface ornamentation, the ornamentation shown simply being illustrative.

To effect the aforesaid configuration, the mold half 12 constitutes a pair of side walls 18, 20 which meet at a dihedral angle 22 of 90°. The side walls are generally flat. Each side wall is provided with an internally facing depression 24, 26 which appears on the outer face of the side wall as a raised portion. When the two halves are brought together in matching registry and abutment, the four side walls jointly define a square prismatic cavity with the three-dimensional ornamentation aforementioned.

The upper edge of each side wall is formed with an inwardly extending, flat, short horizontal top flange 28, 30 whereby the top of the cavity when the two halves are assembled has a large opening 32 defined by the inner edges of the flanges 28, 30, 28', 30'. Although it is of no importance, the flanges are of uniform widths so that the top opening, like the interior of the mold cavity, is square. In order to support a wick engaging bar 34, each mold half is provided with a groove 36, 36' respectively, the grooves being in alignment and located in the top flanges directly above the dihedral angles 22, 22'. The ends of the bar 34 rest in the grooves 36, 36'.

The mold half 12, further, has a bottom wall 38 which completely covers the bottom end of the mold cavity half (see FIG. 2) so that the two bottom walls 38, 38' form a closed bottom for the mold cavity. The bottom walls 38, as just stated, fully cover the bottom of each cavity defining portion. However, as to the mold half 14, the covering function of the bottom wall 38' is not quite complete because, as will be mentioned hereinafter, there is a groove which minutely prevents the bottom wall 38' from fully covering the bottom of the cavity defining portion 16', this groove, however, in the operation of the mold being filled by a wick which will prevent leakage of liquid wax at such point.

The mold half 12 has a web 40 which extends down the sides of the cavity defining portion 16 and across the bottom thereof. The web is flat and all portions thereof lie in a common vertical plane. The web is at an angle of 45° to the side walls 18, 20 and at an angle of 90° to the bottom wall 38. The web extends outwardly from the cavity defining portion 16 and, in effect, constitutes a peripheral extension thereof except at the top where it is not present.

The outer zone of the web of the mold half 12 includes a groove 42 of rectangular cross-section. The groove is comparatively shallow, its depth being approximately one-half the thickness of the web 40, and its width being approximately equal to its depth. These particular ratios are mentioned by way of example only and are not to be considered illustrative. The groove 42 runs linearly down the side of the web 40 and linearly across the bottom portion of the web. The groove is continuous.

Spaced slightly outwardly from the groove 42 and running along both side edges and the bottom edge of the web 40 is a right-angled squat flange 44.

Turning now to the mold half 14, it does not include a groove 42. Instead it has a rib 46 also sometimes referred to herein as a tongue. The rib 46 is arranged and dimensioned to nicely fit into the groove 42 along the length thereof. Like the groove 42, it is continuous. However, it has a narrow interruption, to which reference previously has been made, where a shallow groove 48 crosses said rib at a right angle thereto. The groove 48 extends from the cavity defining portion 16 to the bottom edge of the web 40', its purpose being to receive the lower end of a wick 50 the upper end of which is secured by a knot 52 to approximately the middle of the bar 34.

The outer edge, both the side edges and the bottom edge of the web 40', like the web 40, include a squat flange 54. Said flange is so disposed that when the two halves are assembled the squat flange 54 will be snugly nested against the squat flange 44 but will project a short distance beyond the same. The nested flanges and the tongue-and-groove constitute a dam and labyrinth seal which is continuous from one top edge to the other, down the sides and across the bottom of the mold 10.

However, the seal will not maintain itself. Clamping means must be provided to hold the two parts of the dam seal together, i.e., to hold the parts of the dam and seal in the two mold halves together. Such means is a critical feature of the present invention and constitutes a clamp having a stationary part and a movable part. The movable part is in one piece with one of the mold halves and has not yet been described. The stationary part is the flange 54. These two cooperating parts of the clamping means are, respectively, unitary with the two mold halves, i.e., made in one piece therewith. Indeed, they are made with the mold halves while the same are being injection molded and it is important to the invention that such parts are unitary, as aforesaid, inasmuch as it greatly simplifies their manufacture, lowers their cost and prevents the presence of loose parts which a child could lose or which a packer might not include in a molding kit. As now will be seen, the movable portion of the clamping means is uniquely constructed to enable it to be molded in one piece with the mold half 12.

The movable clamping portion constitutes, at each side of the web 40 and at the bottom edge of the web, immediately outwardly of the flange 44, a long living hinge 56 (one for each said edge of the web 40). The living hinges are in one piece with the mold half 12. Each such hinge constitutes a thin section of the plastic material from which the mold is formed, this being polypropylene. Polypropylene, characteristically, in thin sections is quite flexible and, therefore, can be used as a living hinge. It is a hinge which is capable of enabling the parts connected thereby to be readily articulated (either swinging relative to the other). The movable clamping means further includes, attached to the distal edge of each living hinge (the proximal edge of the living hinge is connected to the base of the flange 44), an elongated pressure jaw 58 of L-shaped cross-section, one for each said edge of the web 40. Each pressure jaw includes two walls 60, 62 at right angles to each other. The wall 60 is in one piece with the distal edge of the living hinge and the wall 62 extends toward the flange 54 when the two mold halves are assembled and locked together. The free edge of the wall 62 (remote from the wall 60) is provided with a plurality of narrow, short walls 64 parallel to the wall 60 and extending in the same direction as the wall 60 from the wall 62, so that the walls 60, 62, 64 mutually define a J-shaped configuration (for the length of each of the walls 64). The walls 64 are spaced from one another in the direction of the length of the wall 62, although this is not a necessary feature of the present invention inasmuch as the wall 64 could be continuous for substantially the full length of the wall 62. Adjacent the free edges of each of the walls 64 is a rib 66 which extends a short distance toward the wall 60.

The walls 60, 62, 64 and the ribs 66 are so dimensioned that when the pressure jaw 58 is swung from a disengaged position, shown in a dot-and-dash lines in FIG. 3, to a clamping position, shown in solid lines in the same figure, the ribs 66 will forceably engage the exposed inner surface of the squat flange 54 and thereby will press the squat flanges 44, 54 tightly against each other. At the same time, the wall 62 will press against the exposed edge of the flange squat 54 which flange is sufficiently wide thus to be engaged by said wall, and thereby the squat flange 54 and its associated web 40' will be pressed against the web 40 of the opposed mold half, while concurrently the tongue 46 will be pressed into the groove 42 to effect a retaining dam. Thereby a secure labyrinth clamp seal is effected between the two mold halves around the periphery of the cavity formed by the two cavity defining portions 16 of said mold halves. Thus, despite the comparative flexibility of the two mold halves, being made, as they are, from polypropylene in thin sections, although not as thin as the living hinges, said halves mutually reinforce each other because the two mold halves are pressed together firmly and securely.

The distance from the living hinge to the ribs 66 is slightly less than the distance from the living hinge to the corner of the squat flange 54 on the exposed face of said flange. Due to this arrangement, when a pressure jaw is swung from its open to its closed position, the rib 66 must be forced past this corner before it reaches closed position; to permit this to occur, the walls 64 as well as the walls 62 and 60 flex slightly to expand the distance from the living hinge to the rib 66, the polypropylene permitting this flexure. As soon as the rib clears said corner, the strain engendered in the pressure jaw will restore the rib to its original configuration in which it will press against the exposed face of the squat flange 54 so that, in effect, a dead lock is provided, the rib being unable to move back over the aforesaid corner of the squat flange 54 upon the deliberate application of manual force by a user of the mold, which force is applied in a direction to force the jaw away from its closed position. The interruptions between the walls 64, i.e., the spacing apart of said walls, provide access to the free edge of the wall 62 so that a user of the mold easily can apply the necessary opening force to the pressure jaws.

In order to ease the movement of the pressure jaw to its closed and locked position, a chamfer 68 is formed on the corner of the rib 66 facing the web 40' in the closed position of the pressure jaw.

It will be appreciated that, since there are plural pressure jaws at both sides edges and at the bottom edge of the mold half 12, an excellent seal is provided around all of the periphery of the assembled mold, except the top which is open for admission of the material to be cast.

Each mold half 12, 14 is provided with a base, the two bases jointly constituting the base of the assembled mold 10 and enabling it to be free-standing. Inasmuch as the bases for the mold halves are identical, only the base for the mold half 12 will be described. Said base constitutes two thimbles 70. One thimble is provided adjacent one bottom corner of the mold half and the other adjacent the other bottom corner. The thimble extends away from the web 40 in the same direction as the cavity defining portion 16. The bottom of the thimble is flat and parallel to the bottom wall 38. By providing two such spaced thimbles for each mold half, so that, in all, there are four spaced thimbles the bottom walls of all of which are in a common plane perpendicular to the interface plane of the two mold halves, an exceptionally stable base is formed which makes the mold 10 free-standing.

The thimbles 70 are in one piece with their mold half. However, since they are very low on their mold half, indeed, being essentially at the bottom of the web 40, connection to the bottom of the web is not strong enough. Therefore, to reinforce this connection, each thimble is further joined to its web by a gusset plate 72, one edge of which is in one piece with the top wall of the thimble and the other edge of which is in one piece with the outer surface of the web 40. For maximum stability of open ends of the thimbles of the two halves face each other whereby there is a maximum span between the thimbles and thereby there is less chance that a filled mold might accidentally tilt which would be awkward if the material in the mold still is liquid. This permits easy molding of the same in one piece with the remainder of the respective mold halves.

In order to simplify molding of the ribs 66, particularly in an injection molding machine, the wall 60 is interrupted by openings 74 through which mold pins are inserted to define the surfaces of the walls 64 and ribs 66 opposed to the wall 60. Desirably, the pressure jaws and the associated living hinges are molded in an open position of the pressure jaws as illustrated, for example, in FIG. 7, since in such position a mold having fewer moving parts can be used; however, the pressure jaws also can be molded in the position such as shown in dot-and-dash lines in FIG. 3.

An alternate form of the invention is illustrated in FIG. 8 in which there is shown a modified form of bar 76 for supporting the upper end of the wick 50. It will be recalled that in the FIGS. 1–7 form of the invention the upper end of the wick was tied to a bar 34. It may be inconvenient for a small child to tie a knot on a bar and, in order to assist the child in using the mold 10 without being subjected to this inconvenience, the bar 76 can be employed. Said bar constitutes an elongated slat having a notch 78 at its center and a locating pin 80 adjacent each end. The pins extend in the same direction from a common surface of the bar 76.

In order to cooperate with this modified form of wick supporting bar 76, the mold half 12 with the groove 42 therein has the upper ends of said groove at the side edges of the web 40 enlarged to create upwardly facing sockets 82. The sockets are of the proper size to snugly admit the pins 80 fully seated therein whereby, once emplaced, the bar 76 will tend to remain in position and a child, in order to secure the upper end of the wick on the bar 76, simply has to have an adult tie an overhand knot near one end of the wick, after which the child slips the wick under the knot into the notch 78, the notch being of the proper size to admit the wick while slightly compressing the same. Then the child pulls down on the wick until the knot seats on the upper surface of the bar 76. Such a simple operation is well within the manual skill even of a young child.

As has been mentioned heretofore, the preferred material for fabrication of the mold halves 12, 14 by injection molding is polypropylene, a principal reason for the same being the ease with which this particular synthetic plastic can be used in thin sections to form living hinges which are desirable for connection of the pressure jaws to the webs without utilizing a multi-piece hinge. However, polypropylene has other advantages which assist in the utility of a split mold. One of these is that polypropylene commercially is provided as a powder which, when molded by injection molding creates a translucent molded piece. The translucency of the assembled mold enables a user to ascertain the height to which a settable liquid is present within the mold cavity at any given time. This has certain advantages. For instance, the major use of the mold 10 is for casting wax candles. The wax is heated in a pot until it is liquid and then poured into the open top of the mold. There is an element of danger in pouring too much wax into the mold because of overflow of hot wax can burn a user and become embedded in fabrics near the mold. It is usually not desired to fill the mold to the very top. Therefore, the child or person who is pouring the liquid wax into the mold should be able to ascertain the height of the wax at any given time to prevent overflow. He could do this by looking into the mold through its open top, but this would subject him to the fumes of the hot liquid wax and to the heat emanating from the wax. However, by enabling the user to see the height of the wax from the outside of the mold without looking into the top, such disadvantages are overcome. Moreover, it sometimes is desirable to pour differently colored waxes into the mold, a given color being allowed to set before pouring on a segment of another color. The user of the mold usually has in mind the desirability of having any given colored section a certain height or in a certain ratio with respect to other colored sections. He can readily determine this by inspecting the height of the liquid wax from the outside of the mold, again without looking into the mold through its top.

The use of polypropylene has still another advantage in casting of materials, e.g., wax. It is that the wax has a tendency to adhere to surfaces, but the surfaces of a polypropylene component is slick enough to prevent this from happening so that it is not necessary to coat the inner surfaces of the mold sections 16, 16' with a parting material such as Teflon or Quilon.

Attention further is called to the fact that due to the pressure exerted by the pressure jaws between the two halves of the mold up to the cavity defining portions, e.g., on the webs 40, 40', there is but little tendency for the material being molded to creep into the interface between the two webs and through the tongue-and-groove dam. Hence, a candle or the like made in the mold 10 will not have a noticeable amount of flash, and the flash, if any, will be quite thin so that it readily can be removed either with a cutting tool, a scraping tool or a hot smoothing tool.

Although it repeatedly has been stated that the material of choice to be cast in the mold 10 is liquid wax, the mold is capable of forming any other material which will be introduced into the same in a liquid or pliable state into a three-dimensional object which will retain its shape after the mold halves are separated from each other. Typical such other materials are soap and modeling clay, as well as epoxies and RTV elastomers which cure at room temperature upon standing. Also clay can be packed into the mold cavity to form clay objects.

It thus will be seen that there is provided a hobby casting mold which achieves the various objects of the invention and which is well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described the invention, there is claimed as new and desired to be secured by Letter Patent:

1. A two-piece hobby casting mold comprising:
   A. two mold sections
      i. each having a cavity defining portion,
      ii. said cavity defining portions facing each other when the two mold sections are abutted so as to provide a complete mold cavity,
      iii. said mold sections mutually defining an open top for the mold cavity,
   B. each of said sections having a flat web which extends laterally outwardly and downwardly from said cavity defining portion,
   C. said webs being in face-to-face contact when the sections are mutually abutted,
   D. and an essentially continuous labyrinth clamp seal extending down the sides and across the bottom of said mold,
      i. said seal constituting two halves of which one is in one piece with one of the sections and the other is in one piece with the other section,
      ii. a hinge joining at least one of the halves to its associated section,
      iii. a different base for each section,
      iv. said base being in one piece with the respective sections and having bottoms in a common plane,
      v. said sections being of synthetic plastic and the hinge being a living hinge,
      vi. in one piece with the respective section,
   E. said plastic being translucent so that the level of material within the mold can be seen from outside without looking through the open top, and
   F. the inner surface of said cavity defining portions being slick so that it will not adhere to material introduced into the mold cavity and set therein.

2. A mold as set forth in claim 1 wherein each mold section has an inwardly extending flange at the upper end of the cavity defining portion, the flanges of the two sections conjointly defining the open top for the mold cavity.

3. A mold as set forth in claim 1 wherein the upper portions of the two sections have means defining aligned grooves to have seated therein the ends of a bar for supporting the upper end of a wick.

4. A mold as set forth in claim 1 wherein the cavity defining portions include bottom walls and wherein the web of one of the sections has a vertically extending groove running down from the bottom wall of that section and located in the part of the web which extends downwardly from the cavity defining portion.

5. A mold as set forth in claim 1 wherein the labyrinth clamp seal includes three parts, two of the parts extending respectively down the sides of the webs and the third part extending across the bottom of the web.

6. A mold as set forth in claim 5 wherein the labyrinth clamp seal includes a flange extending away from a perimetral zone of the web of the one mold section and a pressure jaw connected to the living hinge of the opposite mold section, said pressure jaw being constructed and arranged to be swung into clamping engagement with the flange of the first-named section.

7. A mold as set forth in claim 6 wherein the pressure jaw is J-shaped in cross-section with the short arm of the J having a rib extending toward the long arm of the J to engage an exposed surface of the flange of the first-named mold section.

8. A mold as set forth in claim 7 wherein the base of the J is so constructed and arranged with respect to said flange as to press against said flange when the pressure jaw is in closed position.

9. A mold as set forth in claim 8 wherein the rib of the pressure jaw is constructed and arranged with respect to the flange such that the pressure jaw must be flexed to enable said jaw to clear the flange when moving to closed position.

10. A mold as set forth in claim 6 wherein both sections include perimetral squat flanges extending in the same direction when the mold sections are assembled and constructed and arranged so that one flange nests within the other.

11. A mold as set forth in claim 10 wherein the living hinge connects the base of one of the flanges to one half of the clamp seal.

12. A mold as set forth in claim 1 wherein the synthetic plastic is polypropylene.

13. A mold as set forth in claim 1 wherein the labyrinth clamp seal includes a tongue on one mold section and a mating groove on the other mold section.

14. A mold as set forth in claim 13 wherein the tongue and groove run down the sides and across the bottom of the webs.

15. A mold as set forth in claim 14 wherein the upper ends of the groove at the sides of the web in which the groove is situated are enlarged and wherein a slat is provided having a central notch for receiving a wick with a knotted end above the slat and further having pins at its opposite ends, said pins being snugly receivable in the enlarged ends of the grooves.

16. A mold as set forth in claim 1 wherein the cavity defining portions of the mold sections have internal depressions to form deeply ornamented surfaces on an object cast in the mold.

17. A mold as set forth in claim 1 wherein the base for each section constitutes a pair of thimbles having open ends facing in the same direction as the open sides of the cavity defining portion of such section, the bottoms of all thimbles being in a common horizontal plane.

18. A mold as set forth in claim 17 wherein the bottoms of the thimbles are flat.

19. A mold as set forth in claim 17 wherein the open ends of the thimbles in each mold section face the open ends of the thimbles in the opposite mold section.

20. A mold as set forth in claim 17 which further includes for each thimble a gusset in one piece with the associated mold section, each gusset having one edge perpendicular to and unitary with the web of the associated mold section and another edge perpendicular to and unitary with the top of the thimble.

* * * * *